US005889205A

United States Patent [19]

Treinies et al.

[11] Patent Number: 5,889,205

[45] Date of Patent: Mar. 30, 1999

[54] METHOD FOR DETERMINING AN AIR MASS FLOW INTO CYLINDERS OF AN INTERNAL COMBUSTION ENGINE WITH THE AID OF A MODEL

[75] Inventors: Stefan Treinies; Maximilian Engl, both of Regensburg; Gerd Rösel, Dresden, all of Germany

[73] Assignee: Siemens Aktiengesellschaft, Munich, Germany

[21] Appl. No.: 949,169

[22] Filed: Oct. 10, 199760

Related U.S. Application Data

[63] Continuation of PCT/DE96/00615, Apr. 9, 1996.

[30] Foreign Application Priority Data

Apr. 10, 1995 [DE] Germany ........................ 195 13 601.2

[51] Int. Cl.[6] .................................................... G01M 15/00

[52] U.S. Cl. ............................................................ 73/118.2

[58] Field of Search .................................... 73/116, 117.1, 73/117.2, 117.3, 118.2, 119 A; 123/480; 701/103, 59

[56] References Cited

U.S. PATENT DOCUMENTS

| | | | |
|---|---|---|---|
| 5,012,422 | 4/1991 | Takahashi et al. | 73/118.2 |
| 5,270,935 | 12/1993 | Dudek et al. | 73/118.2 |
| 5,293,553 | 3/1994 | Dudek et al. | 123/460 |
| 5,377,112 | 12/1994 | Brown, Jr. et al. | 73/117.3 |
| 5,497,329 | 3/1996 | Tang | 73/118.2 |
| 5,714,683 | 2/1998 | Maloney | 73/118.2 |

FOREIGN PATENT DOCUMENTS

| | | |
|---|---|---|
| 0326065A2 | 8/1989 | European Pat. Off. . |
| 0594114A2 | 4/1994 | European Pat. Off. . |
| 3919448A1 | 12/1989 | Germany . |
| 4325902A1 | 2/1995 | Germany . |
| 2225877 | 6/1990 | United Kingdom . |

*Primary Examiner*—Richard Chilcot
*Assistant Examiner*—Eric S. McCall
*Attorney, Agent, or Firm*—Herbert L. Lerner; Laurence A. Greenberg

[57] ABSTRACT

A method for determining an air mass flow into cylinders of an internal combustion engine with the aid of a model includes calculating an air mass actually flowing into a cylinder with the aid of an intake tube filling model supplying a load variable on the basis of which an injection time is determined, from input variables relating to throttle opening angle and ambient pressure and from parameters representing valve control. The load variable is used for prediction in order to estimate the load variable at an instant which is at least one sampling step later than a current calculation of the injection time.

11 Claims, 4 Drawing Sheets

METHOD FOR DETERMINING AN AIR MASS FLOW INTO CYLINDERS OF AN INTERNAL COMBUSTION ENGINE WITH THE AID OF A MODEL

CROSS-REFERENCE TO RELATED APPLICATION

This application is a continuation of International Application Ser. No. PCT/DE96/00615, filed Apr. 9, 1996.

BACKGROUND OF THE INVENTION

FIELD OF THE INVENTION

The invention relates to a method for determining an air mass flow into cylinders of an internal combustion engine with the aid of a model, including an intake system having an intake tube with a throttle valve disposed therein and a throttle position sensor detecting an opening angle of the throttle valve; a sensor generating a load signal of the internal combustion engine; and an electric control device calculating a basic injection time on the basis of a measured load signal and a speed of the internal combustion engine.

Engine management systems for internal combustion engines which operate with fuel injection require the air mass $m_{Zyl}$, taken in by the engine as a measure of engine load. That variable forms the basis for realizing a required air/fuel ratio. Increasing demands being placed on engine management systems, such as the reduction in pollutant emission by motor vehicles, lead to the need to determine the load variable for steady-state and non-steady state operations with low permissible errors. In addition to such operation, the exact detection of load during a warming-up phase of the internal combustion engine offers considerable potential for pollutant reduction.

In engine management systems controlled by air mass, in non-steady state operation, the signal of the air mass meter disposed upstream of the intake tube, which is a signal that serves as a load signal of the internal combustion engine, is not a measure of the actual filling of the cylinders, because the volume of the intake tube downstream of the throttle valve acts as an air reservoir which has to be filled and emptied. However, the decisive air mass for calculating the injection time is that air mass which flows out of the intake tube and into the respective cylinder.

Although the output signal of the pressure sensor reproduces the actual pressure conditions in the intake tube in engine management systems controlled by intake tube pressure, the measured variables are not available until relatively late, inter alia because of the required averaging of the measured variable.

The introduction of variable intake systems and variable valve timing mechanisms, for empirically obtained models for acquiring the load variable from measuring signals, has produced a very large multiplicity of influencing variables which influence the corresponding model parameters.

Model-aided computational methods based on physical approaches represent a good starting point for the exact determination of the air mass $m_{Zyl}$.

German Published, Non-Prosecuted Patent Application DE 39 19 448 A1, corresponding to U.S. Pat. Nos. 5,003,950 and 5,069,184, discloses a device for the control and advance determination of the quantity of intake air of an internal combustion engine controlled by intake tube pressure, in which the throttle opening angle and the engine speed are used as the basis for calculating the current value of the air taken into the combustion chamber of the engine. That calculated, current quantity of intake air is then used as the basis for calculating the predetermined value of the quantity of intake air which is to be taken into the combustion chamber of the engine at a specific time starting from the point at which the calculation was carried out. The pressure signal, which is measured downstream of the throttle valve, is corrected with the aid of theoretical relationships so that an improvement in the determination of the air mass taken in is achieved and a more accurate calculation of the injection time is thereby possible. However, in non-steady state operation of the internal combustion engine it is desirable to carry out the determination of the air mass flowing into the cylinders even more accurately.

SUMMARY OF THE INVENTION

It is accordingly an object of the invention to provide a method for determining an air mass flow into cylinders of an internal combustion engine with the aid of a model, which overcomes the hereinafore-mentioned disadvantages of the heretofore-known methods of this general type, which performs the determination with high accuracy and which furthermore compensates system-induced dead times that can occur when calculating an injection time because of fuel advance and computing time.

With the foregoing and other objects in view there is provided, in accordance with the invention, a method for determining an air mass flowing into at least one cylinder of an internal combustion engine, which comprises providing an intake system of an internal combustion engine with an intake tube, a throttle valve disposed in the intake tube, and a throttle position sensor detecting an opening angle of the throttle valve; generating a load signal of the internal combustion engine with a sensor; calculating a basic injection time on the basis of a measured load signal and a speed of the internal combustion engine with an electric control device; simulating conditions in the intake system with an intake tube filling model using the opening angle of the throttle valve, ambient pressure and parameters representing a position of the valve as input variables of the model; describing a model variable for an air mass flow at the throttle valve with an equation for a flow of ideal gases through throttling points; describing a model variable for an air mass flow into at least one cylinder of the internal combustion engine as a linear function of pressure in the intake tube using a mass balance of the air mass flows; combining the model variables with a differential equation and calculating the intake tube pressure from the combined model variables as a determining variable for determining an actual load on the internal combustion engine; and obtaining the air mass flowing into the at least one cylinder by integration from a linear relationship between the calculated intake tube pressure and the model variable for the air mass flow into the at least one cylinder.

In accordance with another mode of the invention, there is provided a method which comprises using the load signal measured by the load sensor in a closed control loop for correction and for adjustment of the model variables, with the load signal serving as a reference variable of the control loop.

In accordance with a further mode of the invention, there is provided a method which comprises carrying out the adjustment step during at least one of steady-state and non-steady state operation of the internal combustion engine, while taking a response of the load sensor into account.

In accordance with an added mode of the invention, there is provided a method which comprises assigning a value of a reduced cross section of the throttle valve to each measured value of the throttle opening angle, and carrying out the adjustment of the model values by correcting the reduced cross section with a correction variable for minimizing a system deviation between the reference variable and a corresponding model variable.

In accordance with an additional mode of the invention, there is provided a method which comprises determining the reduced cross section from stationary measurements on an engine test bed and storing the reduced cross section in an engine characteristic map of a memory of the electric control device.

In accordance with yet another mode of the invention, there is provided a method which comprises subdividing a flow function present in the flow equation into individual sections in the representation of the model variable for the air mass flow at the throttle valve, approximating the sections with rectilinear sections, determining a gradient and an absolute term of the respective rectilinear sections as a function of a ratio of the intake-tube pressure and the ambient pressure, and storing the gradient as well as the absolute term in an engine characteristics map.

In accordance with yet a further mode of the invention, there is provided a method which comprises fixing a gradient and an absolute term of the linear function for the model variable for the air mass flow into the at least one cylinder as a function of at least one parameter selected from the group consisting of speed of the internal combustion engine, number of cylinders, intake tube geometry, air temperature in the intake tube and valve control character.

In accordance with yet an added mode of the invention, there is provided a method which comprises determining the parameters by steady-state measurements on an engine test stand and storing the parameters in engine characteristics maps.

In accordance with yet an additional mode of the invention, there is provided a method which comprises calculating the air mass $\hat{m}_{Zyl}$ flowing into the at least one cylinder according to the relationship:

$$\hat{m}_{Zyl}[N] = \frac{T_A}{2} \cdot (\hat{\dot{m}}_{Zyl}[N-1] + \hat{\dot{m}}_{Zyl}[N])$$

where:

$T_A$: sampling time or segment time, $\hat{\dot{m}}_{Zyl}[N]$: model variable of the air mass flow during the current sampling step or segment, and $\hat{\dot{m}}_{Zyl}[N-1]$: model variable of the air mass flow during the previous sampling step or segment.

In accordance with again another mode of the invention, there is provided a method which comprises estimating the air mass $\hat{m}_{Zyl}$ flowing into the at least one cylinder for a specific prediction horizon H in the future with respect to a current load detection at a sampling instant [N], by estimating a corresponding pressure value in accordance with the following relationship:

$$\hat{m}_{Zyl}[N+H] = T_A \cdot \left( \gamma_1 \cdot \left\{ \hat{P}_S[N] + (H-0.5) \cdot \frac{T_A}{2} \cdot [\hat{P}_S[N-1] + \hat{P}_S[N]] \right\} + \gamma_0 \right)$$

where:

$T_A$: sampling time or segment time,

H: prediction horizon, number of sampling steps in the future, $\gamma_1$: gradient of the linear equation, $\gamma_0$: absolute term for determining $\hat{m}_{Zyl}$, and N: current sampling step.

In accordance with a concomitant mode of the invention, there is provided a method which comprises fixing a number of segments for which the load signal for the future is to be estimated, as a function of speed.

Starting from a known approach, a model description is obtained which is based on a nonlinear differential equation. An approximation of this nonlinear equation is presented below. As a result of this approximation, the system behavior can be described through the use of a bilinear equation which permits a fast solution of the relationship in the engine management unit of the motor vehicle under real-time conditions. The selected model approach in this case contains the modeling of variable intake systems and systems having variable valve timing mechanisms. The effects caused by this configuration and by dynamic recharging, that is to say by reflections of pressure waves in the intake tube, can be taken into account very effectively exclusively by selection of parameters of the model which can be determined in the steady state. All model parameters can be interpreted physically, on one hand, and are to be obtained exclusively from steady-state measurements, on the other hand.

Most algorithms for time-discrete solution of the differential equation which describes the response of the model used herein require a very small computing step width in order to operate in a numerically stable manner, chiefly in the case of a small pressure drop across the throttle valve, that is to say in the case of full load. The consequence would be an unacceptable outlay on computation in determining the load variable. Since load detection systems mostly operate in a segment-synchronous manner, that is to say for 4-cylinder engines a measured value is sampled every 180° CS, the model equation likewise has to be solved in a segment-synchronous manner. An absolutely stable differential scheme for solving differential equations is used below, which ensures numerical stability for any given step width.

The model-aided computational method according to the invention also offers the possibility of predicting the load signal by a selectable number of sampling steps, that is to say a forecast of the load signal with a variable prediction horizon. If the prediction time, which is proportional to the prediction horizon given a constant speed, does not become too long, the result is a predicted load signal of high accuracy.

Such a forecast is required because a dead time arises between the detection of the relevant measured values and the calculation of the load variable. Furthermore, for reasons of mixture preparation, it is necessary before the actual start of the intake phase of the respective cylinder for the fuel mass, which is at a desired ratio to the air mass $m_{Zyl}$ in the course of the impending intake phase, to be metered as accurately as possible through the injection valves. A variable prediction horizon improves the quality of fuel metering in non-steady state engine operation. Since the segment time decreases with rising speed, the injection operation must begin earlier by a larger number of segments than is the case at a lower speed. In order to be able to determine the fuel mass to be metered as exactly as possible, the prediction of the load variable is required by the number of segments by which the fuel advance is undertaken, in order to maintain a required air/fuel ratio in this case, as well. The prediction of the load variable thus makes a contribution in the form of a substantial improvement in maintaining the required air/fuel ratio in non-steady state engine operation. In this system for model-aided load detection in the known engine management systems, that is to say in the case of engine management systems controlled by air mass or controlled by intake-tube pressure, a correction algorithm is formulated below in the form of a model control loop which, in the case of inaccuracies that are occurring in model parameters, permits a permanent improvement in accuracy, that is to say a model adjustment in the steady-state and non-steady state operation.

Other features which are considered as characteristic for the invention are set forth in the appended claims.

Although the invention is illustrated and described herein as embodied in a method for determining an air mass flow into cylinders of an internal combustion engine with the aid of a model, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
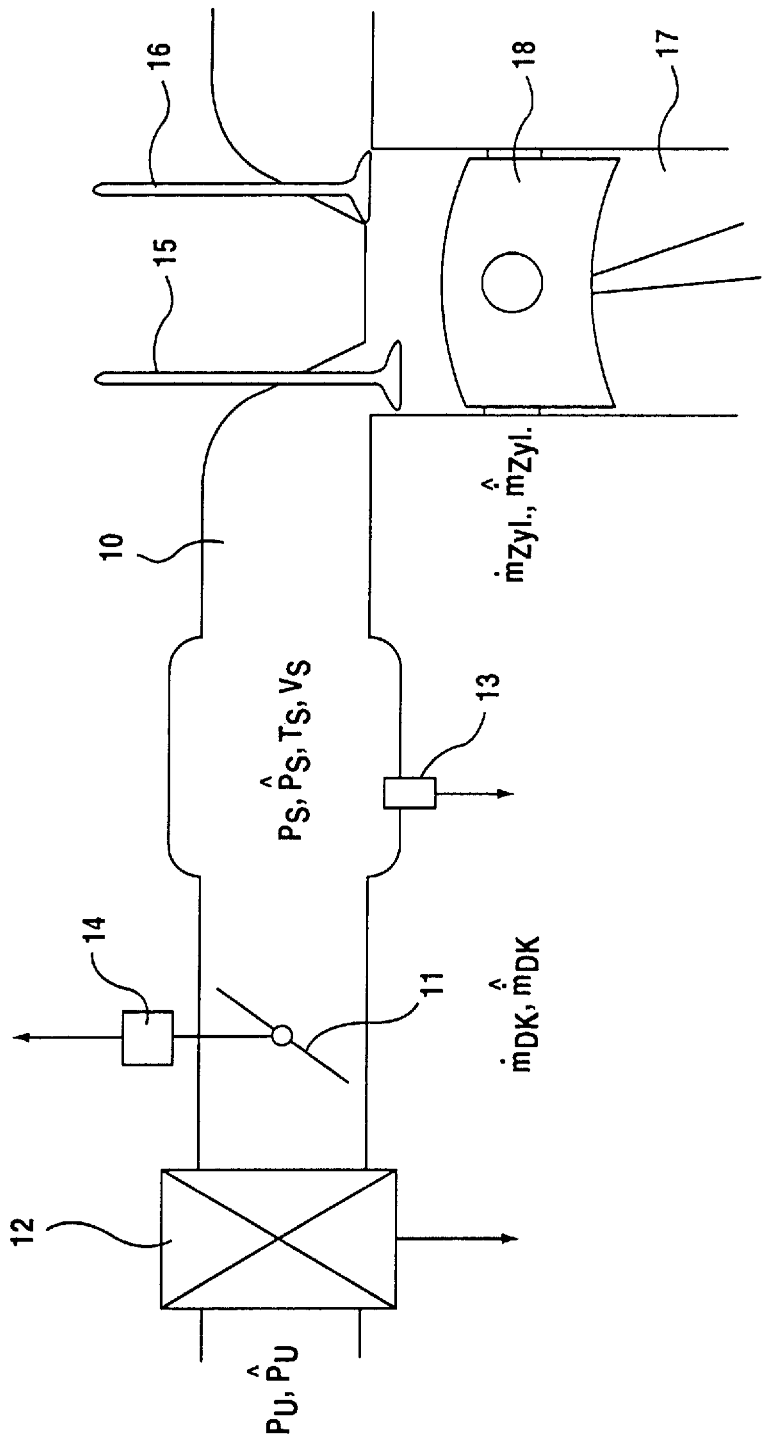
FIG. 1 is a fragmentary, diagrammatic, elevational view of an intake system of a spark-ignition internal combustion engine including corresponding model variables and measured variables.

Referring now to the figures of the drawings in detail and first, particularly, to FIG. 1 thereof, there is seen a configuration from which a model-aided calculation of a load variable $\hat{m}_{Zyl}$ proceeds. For reasons of clarity, only one cylinder of the internal combustion engine is represented herein. In this case, reference numeral 10 designates an intake tube of an internal combustion engine in which a throttle valve 11 is disposed. The throttle valve 11 is connected to a throttle position sensor 14 which determines an opening angle of the throttle valve. In the case of an engine management system controlled by air mass, an air mass meter 12 is disposed upstream of the throttle valve 11, while in the case of an engine management system controlled by intake tube pressure, an intake tube pressure sensor 13 is disposed in the intake tube. Thus, only one of the two components 12, 13 is present, depending on the type of load detection. Outputs of the air mass meter 12, the throttle position sensor 14 and the intake tube pressure sensor 13, which is present as an alternative to the air mass meter 12, are connected to inputs of an electronic control device of the internal combustion engine. The electronic control device is not represented but is known per se. An intake valve 15, an exhaust valve 16 and a piston 18 which can move in a cylinder 17, are also diagrammatically represented in FIG. 1.

Selected variables or parameters of the intake system are also illustrated in FIG. 1. In this case, a caret "^" over a variable signifies that it is a model variable, while variables without a caret "^" represent measured variables. In detail: reference symbol $P_U$ signifies ambient pressure, $P_s$ intake-tube pressure, $T_s$ temperature of air in the intake tube, and $V_s$ volume of the intake tube.

Variables with a point symbol identify the first time derivative of the corresponding variables. Reference symbol $\dot{m}_{DK}$ is thus the air mass flow at the throttle valve, and $\dot{m}_{Zyl}$ is the air mass flow which actually flows into the cylinder of the internal combustion engine.

The fundamental task in the model-aided calculation of the engine load state is to solve the differential equation for the intake tube pressure:

$$\dot{\hat{P}}_S = \frac{R_L \cdot T_S}{V_S} \cdot (\dot{\hat{m}}_{DK} - \dot{\hat{m}}_{Zyl}), \tag{2.1}$$

which can be derived from the equation of state of ideal gases, assuming a constant temperature $T_s$ of the air in the intake tube.

In this case, reference symbol $R_L$ denotes the general gas constant.

The load variable $\hat{m}_{Zyl}$ is determined by integration from the cylinder mass flow $\dot{\hat{m}}_{Zyl}$. The conditions described by equation (2.1) can be applied to multicylinder internal combustion engines having ram tube (switchable intake tube) and/or resonance intake systems without structural changes.

In the case of systems having multipoint injection, in which the fuel metering is performed by a plurality of injection valves, equation (2.1) reproduces the conditions more accurately than is the case for single-point injection, that is to say in the case of injection in which the fuel is metered through the use of a single fuel injection valve. In the case of the first named type of fuel metering, virtually the entire intake system is filled with air. An air-fuel mixture is located only in a small region upstream of the intake valves. In contrast thereto, in the case of single-point injection systems, the entire intake tube is filled with an air-fuel mixture from the throttle valve up to the intake valve, since the injection valve is disposed upstream of the throttle valve. In this case, the assumption of an ideal gas represents a stronger approximation than is the case with multipoint injection. In single point injection, fuel metering is performed in accordance with the variable $\dot{\hat{m}}_{DK}$, and in the case of multipoint injection it is performed in accordance with the variable $\dot{\hat{m}}_{Zyl}$.

The calculation of the variables $\dot{\hat{m}}_{DK}$ and $\dot{\hat{m}}_{Zyl}$ is described in more detail below.

The model variable $\dot{\hat{m}}_{DK}$ of the air mass flow at the throttle valve is described by the equation of the flow of ideal gases through throttling points. Flow losses occurring at the throttling point are taken into account by a reduced flow cross section $\hat{A}_{RED}$. Accordingly, the air mass flow $\dot{\hat{m}}_{DK}$ is determined through the use of the relationship:

$$\dot{\hat{m}}_{DK} = \hat{A}_{RED} \cdot \sqrt{\frac{2k}{k-1} \cdot \frac{1}{R_L \cdot T_S}} \cdot \hat{P}_U \cdot \psi$$

where:

$$\psi=\sqrt{\left(\frac{\hat{P}_S}{\hat{P}_U}\right)^{\frac{2}{k}}-\left(\frac{\hat{P}_S}{\hat{P}_U}\right)^{\left(\frac{k+1}{k}\right)}}$$

for hypercritical pressure relationships or

Ψ=constant for critical pressure relationships (2.2).

$\hat{\dot{m}}_{DK}$: model variable of the air mass flow at the throttle valve $\hat{A}_{RED}$: reduced flow cross section k: adiabatic exponent $R_L$: general gas constant $T_s$: temperature of the air in the intake tube $\hat{P}_U$: model variable of the ambient pressure $\hat{P}_S$: model variable of the intake tube pressure Ψ: flow function.

Flow losses occurring at the throttling point, that is to say at the throttle valve, are taken into account through suitable selection of the reduced cross section $\hat{A}_{RED}$. Given known pressures upstream and downstream of the throttling point and a known mass flow through the throttling point, steady-state measurements can be used to specify an assignment between the throttle valve angle determined by the throttle position sensor 14 and the corresponding reduced cross section $\hat{A}_{RED}$.

If the air mass flow $\hat{\dot{m}}_{DK}$ at the throttle valve is described by the relationship (2.2), the result is a complicated algorithm for the numerically accurate solution of the differential equation (2.1). The flow function Ψ is approximated by a polygon in order to reduce the computational outlay.

Figure 2:
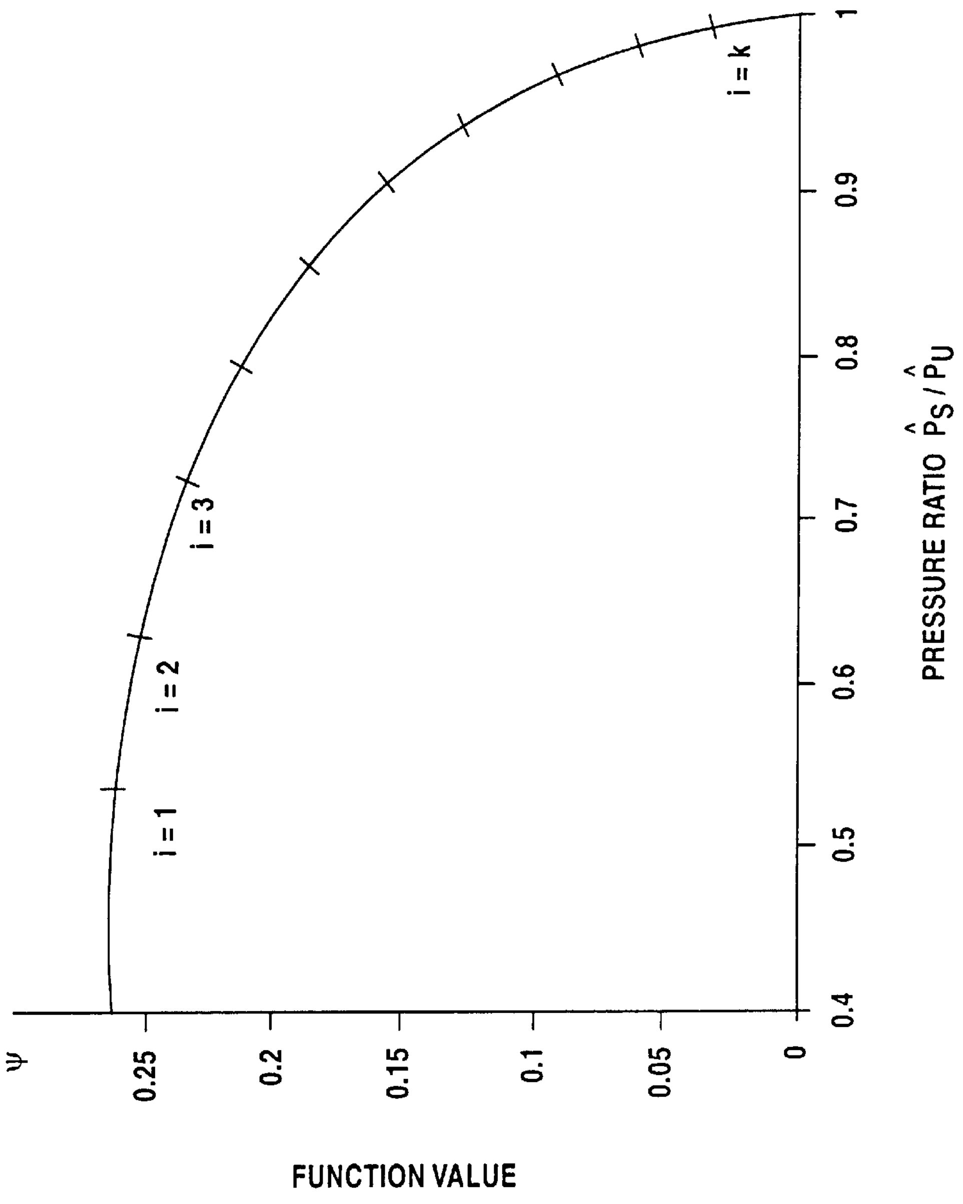
FIG. 2 is a graph showing a flow function and an associated polygon approximation.

FIG. 2 shows the course of the flow function Ψ and the approximation principle applied thereto. Within a section i (i =1 . . . k), the flow function Ψ is represented by a straight line. A good approximation can therefore be achieved with an acceptable number of straight-line sections. Using such an approach, the equation (2.2) for calculating the mass flow $\hat{\dot{m}}_{DK}$ at the throttle valve can be approximated by the relationship:

$$\hat{\dot{m}}_{DK\_APROX}=\hat{A}_{RED}\cdot\sqrt{\frac{2k}{k-1}}\cdot\frac{1}{R_L\cdot T}\cdot\hat{P}_U\cdot\left(m_i\frac{\hat{P}_S}{\hat{P}_U}+n_i\right) \tag{2.3}$$

for i=(1 . . . k).

In this form, $m_i$ describes the gradient and $n_i$ the absolute term of the respective straight-line section. The values of the gradient and of the absolute term are stored in tables as a function of the ratio of the intake-tube pressure to the ambient pressure $$\frac{\hat{P}_S}{\hat{P}_U}.$$

In this case, the pressure ratio $$\frac{\hat{P}_S}{\hat{P}_U}$$

is plotted on the abscissa of FIG. 2, and the functional value (0–0.3) of the flow function Ψ is plotted on the ordinate.

The flow function ψ=constant for pressure ratios $$\frac{\hat{P}_S}{\hat{P}_U}\leq\left(\frac{2}{k+1}\right)^{\frac{k}{k-1}},$$

that is to say the flow at the throttling point then depends only on the cross section and no longer on the pressure ratios. The air mass flowing into the respective cylinders of the internal combustion engine can only be determined analytically with difficulty, since it depends strongly on the charge cycle. The filling of the cylinders is determined to the greatest extent by the intake-tube pressure, the speed and the valve timing.

In order to calculate the mass flow $\hat{\dot{m}}_{Zyl}$ into the respective cylinder as accurately as possible, there is thus a need, on one hand to describe the ratios in the intake tract of the internal combustion engine through the use of partial differential equations, and on the other hand to calculate the mass flow at the intake valve in accordance with the flow equation as a necessary boundary conditions is only this complicated approach which permits account to be taken of dynamic recharging effects, which are decisively influenced by the speed, the intake-tube geometry, the number of cylinders and the valve timing.

Since it is not possible to realize a calculation in accordance with the above-described approach in the electronic management device of the internal combustion engine, one possible approximation proceeds from a simple relationship between the intake-tube pressure $\hat{P}_S$ and the cylinder mass flow $\hat{\dot{m}}_{Zyl}$. For this purpose, it is possible to proceed, to a good degree of approximation, from a linear approach of the form:

$$\hat{\dot{m}}_{Zyl\_APPOROX}=\gamma_1\cdot\hat{P}_S+\gamma_o \tag{2.4}$$

for a wide range of sensible valve timings.

When taking into account all of the essential influencing factors, the gradient $\gamma_1$, and the absolute term $\gamma_0$ of the relationship (2.4) are functions of the speed, the intake-tube geometry, the number of cylinders, the valve timings and the temperature of the air in the intake tube $T_s$. The dependence of the values of the gradient $\gamma_1$, and the absolute term $\gamma_0$ on the influencing variables of speed, intake-tube geometry and number of cylinders and on the valve timings and valve lift curves, can be determined in this case through steady-state measurements.

The influence of ram tube and/or resonant intake systems on the air mass taken in by the internal combustion engine can likewise be reproduced well through this determination of values. The values of the gradient $\gamma_1$ and the absolute term $\gamma_0$ are stored in engine characteristic maps of the electronic engine management device.

The intake-tube pressure Ps is selected as the determining variable for determining the engine load. This variable is to be estimated as exactly and quickly as possible with the aid of the model differential equation. An estimation of the intake-tube pressure $\hat{P}_S$ requires equation (2.1) to be solved.

Through the use of the simplifications introduced with the aid of formulae (2.2) and (2.3), the equation (2.1) can be approximated by the relationship:

$$\hat{\dot{P}}_S=\frac{R_L\cdot T_S}{V_S}\cdot\left(\hat{A}_{RED}\cdot\right. \tag{2.5}$$

-continued $$\left.\sqrt{\frac{2k}{k-1}\cdot\frac{1}{R_L\cdot T_S}}\cdot\hat{P}_U\cdot\left\{m_i\cdot\frac{\hat{P}_S}{\hat{P}_U}+n_i\right\}-\{\gamma_1\cdot\hat{P}_S+\gamma_0\}\right)$$

for i=(1 . . . k). If, in accordance with the preconditions for deriving equation (2.1), the temperature of the air in the intake tube $T_s$ is regarded as a slowly varying measured variable, and the reduced cross section $\hat{A}_{RED}$ is regarded as an input variable, the nonlinear form of the differential equation (2.1) can be approximated by the bilinear equation (2.5).

This relationship is transformed into a suitable difference equation in order to solve equation (2.5).

The following principal demands placed on the properties of the solution of the difference equation to be formed can be formulated as the criterion for selecting the suitable difference scheme:

1. The difference scheme must be conservative even under extreme dynamic demands, that is to say the solution of the difference equation must correspond to the solution of the differential equation, and
2. the numerical stability must be ensured over the entire operating range of the intake-tube pressure at sampling times which correspond to the maximum possible segment times.

Requirement 1 can be fulfilled by an implicit computational algorithm. Due to the approximation of the nonlinear differential equation (2.1) by a bilinear equation, the resultant implicit solution scheme can be solved without the use of iterative methods, since the difference equation can be converted into an explicit form.

Due to the conditioning of the differential equation (2.1) and its approximation (2.5), the second requirement can be fulfilled only by a computing rule for forming the difference equation which operates in an absolutely stable fashion. These methods are designated as A-stable methods. A characteristic of this A-stability is the property possessed by the algorithm of being numerically stable, in the case of a stable initial problem, for arbitrary values of the sampling time, that is to say a segment time $T_A$. The trapezoid rule is a possible computing rule for the numerical solution of differential equations which meets both requirements.

The difference equation produced by applying the trapezoid rule is defined as follows in the present case:

$$\hat{P}_S[N]=\hat{P}_S[N-1]+\frac{T_A}{2}\cdot(\dot{\hat{P}}_S[N-1]+\dot{\hat{P}}_S[N]) \tag{2.6}$$

for N=(1 . . ∞).

Applying this rule to (2.5) yields the relationship:

$$\hat{P}_S[N]= \tag{2.7}$$

$$\frac{\hat{P}_S[N-1]+\frac{T_A}{2}\cdot\dot{\hat{P}}_S[N-1]}{1-\frac{T_A}{2}\cdot\frac{R_L\cdot T_S}{V_S}\cdot\left(\hat{A}_{RED}\cdot\sqrt{\frac{2k}{k-1}\cdot\frac{1}{R_L\cdot T_S}}\cdot m_i-\gamma_i\right)}+$$

$$\frac{\frac{T_A}{2}\cdot\frac{R_L\cdot T_S}{V_S}\cdot\left(\hat{A}_{RED}\cdot\sqrt{\frac{2k}{k-1}\cdot\frac{1}{R_L\cdot T_S}}\cdot\hat{P}_U\cdot n_i-\gamma_0\right)}{1-\frac{T_A}{2}\cdot\frac{R_L\cdot T_S}{V_S}\cdot\left(\hat{A}_{RED}\cdot\sqrt{\frac{2k}{k-1}\cdot\frac{1}{R_L\cdot T_S}}\cdot m_i-\gamma_1\right)}$$

for N=(1 . . . ∞) and i=(1 . . . k) for the purpose of calculating the intake-tube pressure $\hat{P}_S[N]$ as a measure of the engine load.

In this case, [N] signifies the current segment or the current computing step, while [N+1] signifies the next segment or the next computing step. The calculation of the current and predicted load signal is described below.

The calculated intake-tube pressure $\hat{P}_S$ can be used to determine from the relationship (2.4) the air mass flow $\hat{\dot{m}}_{Zyl}$ which flows into the cylinders. If a simple integration algorithm is applied, the relationship:

$$\hat{m}_{Zyl}[N]=\frac{T_A}{2}\cdot(\dot{\hat{m}}_{Zyl}[N-1]+\dot{\hat{m}}_{Zyl}[N]) \tag{2.8}$$

for N=(1 . . . ∞) is obtained for the air mass taken in during one intake cycle of the internal combustion engine.

It is assumed in this case that the initial value of the load variable is zero. In the case of the segment-synchronous load detection, the segment time drops with rising speed, while the number of segments by which a fuel advance is undertaken must rise. For this reason, it is necessary to plan the prediction of the load signal for a variable prediction horizon H, that is to say for a specific number H of segments which is a function chiefly of rotational speed. While taking into account this variable prediction horizon H, it is possible to write equation (2.8) in the form:

$$\hat{m}_{Zyl}[N+H]=\frac{T_A}{2}\cdot(\dot{\hat{m}}_{Zyl}[N+H-1]+\dot{\hat{m}}_{Zyl}[N+H]) \tag{2.9}$$

for N=(1 . . ∞).

It is assumed in further considerations that the segment time $T_A$ and the parameters $\gamma_1$, and $\gamma_0$ of the relationship (2.4), which are required to determine the mass flow $\hat{\dot{m}}_{Zyl}$ from the intake-tube pressure $\hat{P}_S$, do not vary over the prediction time.

With this precondition, the prediction of a value for $\hat{m}_{Zyl}[N+H]$ is achieved by predicting the corresponding pressure value $\hat{P}_S[N+H]$. As a result, equation (2.9) assumes the form:

$$\hat{m}_{Zyl}[N]=\frac{T_A}{2}\cdot(\gamma_1\cdot\{\hat{P}_S[N+H-1]+\hat{P}_S[N+H]\}+2\cdot\gamma_0) \tag{2.10}$$

for N=(1 . . . ∞).

Since in the case of the described method the temporal variation in the intake-tube pressure $\hat{P}_S$ is present in analytical form, the prediction of the pressure value $\hat{P}_S[N+H]$ is achieved below by H-fold application of the trapezoid rule. In this case, the relationship:

$$\hat{P}_S[N+H]=\hat{P}_S[N]+\frac{T_A}{2}\cdot H\cdot(\dot{\hat{P}}_S[N-1]+\dot{\hat{P}}_S[N]) \tag{2.11}$$

is obtained for N=(1 . . ∞).

If the pressure $\hat{P}_s[N+H-1]$ is determined in a similar way, the equation:

$$\hat{m}_{Zyl}[N+H]=T_A\cdot\left(\gamma_1\cdot\left\{\hat{P}_S[N]+(H-0.5)\cdot\frac{T_A}{2}\cdot[\dot{\hat{P}}_S[N-1]+\dot{\hat{P}}_S[N]]\right\}+\gamma_0\right) \tag{2.12}$$

for N=(1 . . ∞) can be specified for the predicted load signal.

If values on the order of magnitude of 1 . . . 3 segments are selected for the prediction horizon H, a good prediction of the load signal can be obtained by using formula (2.12).

The principle of the model adjustment for engine management systems controlled by air mass and by intake-tube pressure is explained below.

The values of the parameters $\gamma_1$ and $\gamma_0$ are affected by a degree of uncertainty caused by the use of engines having variable valve timing and/or variable intake-tube geometry, by manufacturing tolerances and aging phenomena, as well as by temperature influences. As described above, the parameters of the equation for determining the mass flow in the cylinders are functions of multiple influencing variables, of which only the most important can be detected.

In calculating the mass flow at the throttle valve, the model variables are affected by measuring errors in the detection of the throttle angle and approximation errors in the polygonal approximation of the flow function $\psi$. The system sensitivity with respect to the first-mentioned errors is particularly high, especially in the case of small throttle angles. As a result, small changes in the throttle position have a severe influence on the mass flow or intake-tube pressure. In order to reduce the effect of those influences, a method is proposed below which permits specific variables that have an influence on the model calculation to be corrected in such a way that it is possible to carry out a model adaptation for steady-state and non-steady state engine operation which improves accuracy.

The adaptation of essential parameters of the model for the purpose of determining the load variable of the internal combustion engine is performed by correcting the reduced cross section $\hat{A}_{RED}$ determined from the measured throttle angle, through the use of a correction variable $\Delta\hat{A}_{RED}$.

The input variable $\hat{A}_{RED}$ for the corrected calculation of the intake-tube pressure is thus described by the relationship:

$$\hat{A}_{REDKORR}=\hat{A}_{RED}+\Delta\hat{A}_{RED} \qquad (3.11).$$

The input variable $\hat{A}_{RED}$ is then replaced by the correction variable $\hat{A}_{REDKORR}$ in equation (2.2) and the following formulae. The reduced throttle valve cross section $\hat{A}_{RED}$ derived from the measured value of the throttle angle is incorporated into the model calculation in order to improve the subsequent response of the control loop. The correction variable $\Delta\hat{A}_{RED}$ is formed by the realization of a model control loop.

In the case of engine management systems controlled by air mass, the air mass flow $\dot{m}_{DK\_LMM}$ measured at the throttle valve through the use of the air mass meter is the reference variable of this control loop, while the measured intake-tube pressure $P_S$ is used as the reference variable for systems controlled by intake-tube pressure. The value of the correction variable $\Delta\hat{A}_{RED}$ is determined by follow-up control in such a way that the system deviation between the reference variable and the corresponding control variable is minimized.

In order to also achieve improvements in accuracy in dynamic operation through the use of these methods, the detection of the measured values of the reference variable must be simulated as accurately as possible. In most cases, it is necessary to take into account the dynamic response of the sensor, that is to say either of the air mass meter or of the intake-tube pressure sensor and a subsequently executed averaging operation.

The dynamic response of the respective sensor can be modeled to a first approximation as a system of a first order which possibly has delay times $T_1$ that are a function of the operating point. In the case of a system controlled by air mass, a possible equation for describing the sensor response is:

$$\hat{\dot{m}}_{DK\_LMM}[N] = \qquad (3.12)$$

-continued $$e^{-\frac{T_A}{T_1}} \cdot \hat{\dot{m}}_{DK}[N-1] + \left(1 - e^{-\frac{T_A}{T_1}}\right) \cdot \hat{\dot{m}}_{DK\_LMM}[N-1].$$

The ambient pressure $\hat{P}_U$ is a variable which, given the approach selected, has a substantial influence on the maximum possible mass flow $\hat{\dot{m}}_{Zyl}$. For this reason, it is impossible to proceed from a constant value of this variable, and an adaptation is performed instead in the manner described below.

The value of the ambient pressure $P_U$ is varied if the absolute value of the correction variable $\Delta A_{RED}$ exceeds a specific threshold value or if the pressure ratio $$\frac{\hat{P}_S}{\hat{P}_U}$$

is greater than a selectable constant. This ensures that an adaptation to ambient pressure can be performed both in partial-load operation and in full-load operation.

A model adjustment for engine management systems controlled by air mass is explained below. A model structure represented in FIG. 3 can be specified for this system.

Figure 3:
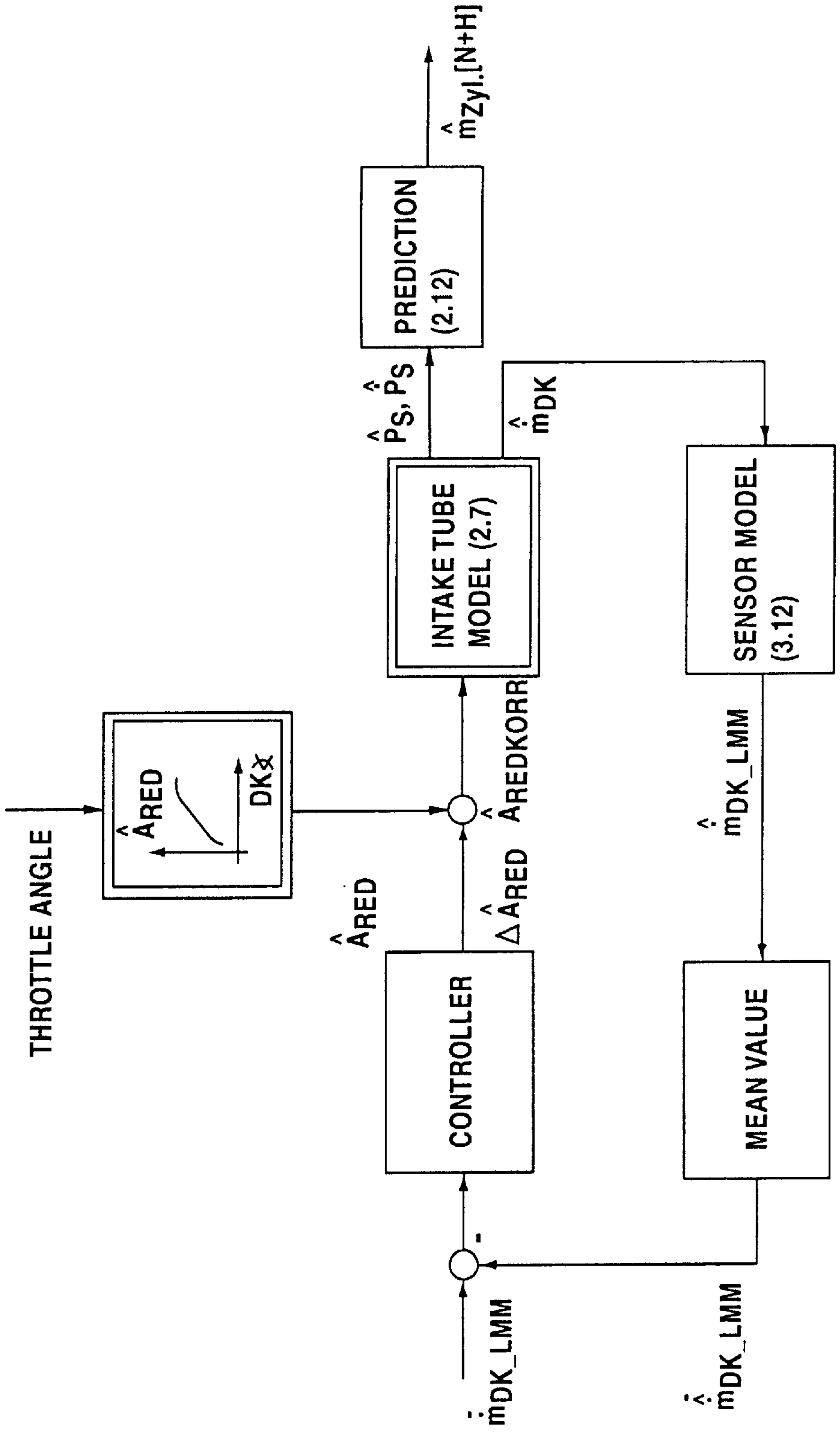
FIG. 3 is a block diagram of a model control loop for engine management systems controlled by air mass.
Figure 4:
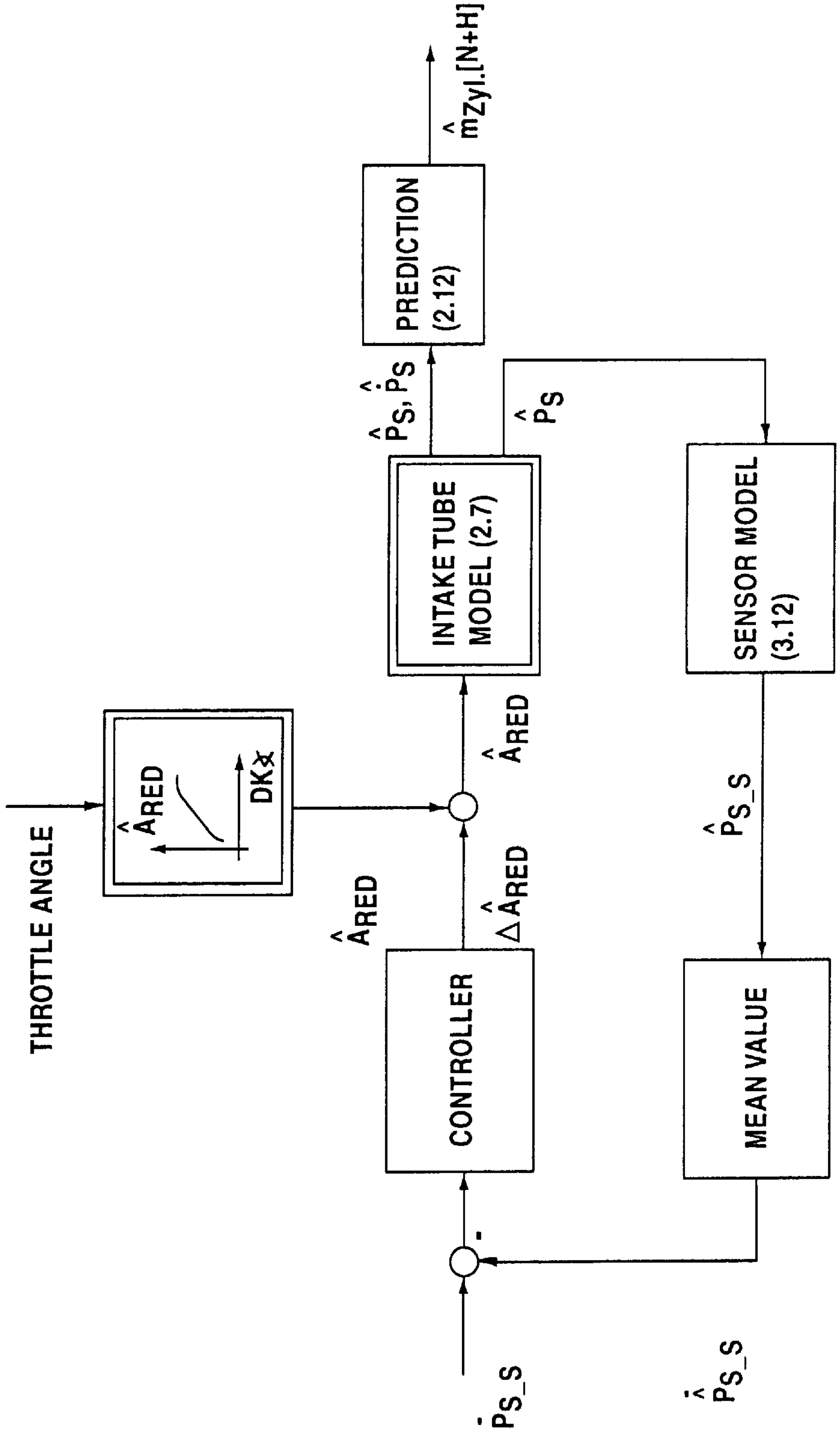
FIG. 4 is a block diagram of a model control loop for engine management systems controlled by intake tube pressure.

The throttle position sensor 14 of FIG. 1 supplies a signal, for example a throttle opening angle, which corresponds to an opening angle of the throttle valve 11. Values for the reduced cross section $\hat{A}_{RED}$ of the throttle valve which are associated with various values of this throttle opening angle are stored in an engine characteristic map of the electronic engine management unit. This assignment is represented by a block entitled "static model" in FIG. 3 and in FIG. 4. The subsystem entitled "intake-tube model" in FIGS. 3 and 4 represents the response described by equation (2.7). The reference variable of this model control loop is the measured value of the air mass flow, averaged over one segment, at the throttle valve $\overline{\dot{m}}_{DK\_LMM}$. If a PI controller is used as the controller in this model control loop, the remaining system deviation vanishes, that is to say the model variable and measured variable of the air mass flow at the throttle valve are identical. The pulsation phenomena of the air mass flow at the throttle valve, which are to be observed chiefly in the case of 4-cylinder engines, lead to substantial positive measuring errors and thus to a reference variable which is strongly subjected to error, in the case of air mass meters which form absolute amounts. A transition may be made to the controlled model-aided operation by switching off the controller, that is to say reducing the controller parameters. It is thus possible for areas in which the pulsations occur to be treated, taking into account dynamic relationships, by using the same method as in the case of those areas in which a virtually undisturbed reference variable is present. In contrast with methods which only take into account relevant measured values at steady-state operating points, the system described herein remains operational virtually without restriction. In the case of the failure of the air mass signal or of the signal from the throttle position sensor, the system presented is capable of forming an appropriate replacement signal. In the case of the failure of the reference variable, the controlled operation must be realized, while in the other case the controlled operation ensures that the operability of the system is scarcely impaired.

The block entitled "intake-tube model" represents the ratios as they are described with the aid of equation (2.7), and therefore it has the model variable $\hat{P}_S$ as well as the time derivative $\hat{\dot{P}}_S$ and the variable $\hat{\dot{m}}_{DK}$ as output variables. After the modeling of the sensor response characteristic, that is to say the response characteristic of the air mass meter, and the sampling, the model variable $\hat{\dot{m}}_{DK\_LMM}$ is averaged, so that the averaged value $\bar{\dot{m}}_{DK\_LMM}$ and the average air mass flow $\bar{\dot{m}}_{DK\_LMM}$ measured by the air mass meter can be fed to a comparator. The difference between the two signals effects a change $\Delta\hat{A}_{RED}$ in the reduced flow cross section $\hat{A}_{RED}$, so that a model adjustment can be performed in steady-state and non-steady state terms.

The model structure represented in FIG. 4 is specified for engine management systems controlled by intake-tube pressure, with the same blocks as in FIG. 3 bearing the same designations. Just as in the case of the engine management system controlled by air mass, the subsystem "intake-tube model" represents the response described by the differential equation (2.7). The reference variable of this model control loop is the measured value of the intake-tube pressure $\bar{P}_{S\_S}$ averaged over one segment. If, just as in FIG. 3, a PI controller is used, the measured value of the pressure in the intake tube $\bar{P}_{S\_S}$ is identical in the steady-state case with the model variable $\bar{P}_{S\_S}$. As described above, the present system also remains operational virtually without restriction, since an appropriate replacement signal can be formed in the case of failure of the intake-tube pressure signal or of the measured value for the throttle angle.

The model variables $\hat{P}_S$, $\hat{\dot{P}}_S$ obtained by the intake-tube model are fed to a block entitled "prediction". Since the pressure changes in the intake tube are also calculated by using the models, these pressure changes can be used to estimate the future pressure variation in the intake tube and thus the cylinder air mass for the next segment [N+1] or for the next segments [N+H]. The variable $\hat{m}_{Zyl}$ or the variable $\hat{m}_{Zyl}$[N+1] are then used for the exact calculation of the injection time during which fuel is injected.

We claim:

1. A method for determining an air mass flowing into at least one cylinder of an internal combustion engine, which comprises:

- providing an intake system of an internal combustion engine with an intake tube, a throttle valve disposed in the intake tube, and a throttle position sensor detecting an opening angle of the throttle valve;
- generating a load signal of the internal combustion engine with a sensor;
- calculating a basic injection time on the basis of a measured load signal and a speed of the internal combustion engine with an electric control device;
- simulating conditions in the intake system with an intake tube filling model using the opening angle of the throttle valve, ambient pressure and parameters representing a position of the valve as input variables of the model;
- describing a model variable for an air mass flow at the throttle valve with an equation for a flow of ideal gases through throttling points;
- describing a model variable for an air mass flow into at least one cylinder of the internal combustion engine as a linear function of pressure in the intake tube using a mass balance of the air mass flows;
- combining the model variables with a differential equation and calculating the intake tube pressure from the combined model variables as a determining variable for determining an actual load on the internal combustion engine; and
- obtaining the air mass flowing into the at least one cylinder by integration from a linear relationship between the calculated intake tube pressure and the model variable for the air mass flow into the at least one cylinder.

2. The method according to claim 1, which comprises using the load signal measured by the load sensor in a closed control loop for correction and for adjustment of the model variables, with the load signal serving as a reference variable of the control loop.

3. The method according to claim 2, which comprises carrying out the adjustment step during at least one of steady-state and non-steady state operation of the internal combustion engine, while taking a response of the load sensor into account.

4. The method according to claim 2, which comprises assigning a value of a reduced cross section of the throttle valve to each measured value of the throttle opening angle, and carrying out the adjustment of the model values by correcting the reduced cross section with a correction variable for minimizing a system deviation between the reference variable and a corresponding model variable.

5. The method according to claim 4, which comprises determining the reduced cross section from stationary measurements on an engine test bed and storing the reduced cross section in an engine characteristic map of a memory of the electric control device.

6. The method according to claim 1, which comprises subdividing a flow function present in the flow equation into individual sections in the representation of the model variable for the air mass flow at the throttle valve, approximating the sections with rectilinear sections, determining a gradient and an absolute term of the respective rectilinear sections as a function of a ratio of the intake-tube pressure and the ambient pressure, and storing the gradient and the absolute term in an engine characteristics map.

7. The method according to claim 1, which comprises fixing a gradient and an absolute term of the linear function for the model variable for the air mass flow into the at least one cylinder as a function of at least one parameter selected from the group consisting of speed of the internal combustion engine, number of cylinders, intake tube geometry, air temperature in the intake tube and valve control character.

8. The method according to claim 7, which comprises determining the parameters by steady-state measurements on an engine test stand and storing the parameters in engine characteristics maps.

9. The method according to claim 1, which comprises calculating the air mass $\hat{m}_{Zyl}$ flowing into the at least one cylinder according to the relationship:

$$\hat{m}_{Zyl}[N] = \frac{T_A}{2}\cdot(\hat{\dot{m}}_{Zyl}[N-1] + \hat{\dot{m}}_{Zyl}[N])$$

where:

$T_A$: sampling time or segment time, $\hat{\dot{m}}_{Zyl}$[N]: model variable of the air mass flow during the current sampling step or segment, and $\hat{\dot{m}}_{Zyl}$ [N−1]: model variable of the air mass flow during the previous sampling step or segment.

10. The method according to claim 1, which comprises estimating the air mass $\hat{m}_{Zyl}$ flowing into the at least one cylinder for a specific prediction horizon H in the future with respect to a current load detection at a sampling instant [N], by estimating a corresponding pressure value in accordance with the following relationship:

$$\hat{m}_{Zyl}[N+H] = T_A \cdot$$

-continued $$\left(\gamma_1 \cdot \left\{ \hat{P}_S[N] + (H - 0.5) \cdot \frac{T_A}{2} \cdot [\hat{P}_S[N-1] + \hat{P}_S[N]] \right\} + \gamma_0\right)$$

where:

$T_A$: sampling time or segment time,

H: prediction horizon, number of sampling steps in the future, $\gamma_1$: gradient of the linear equation, $\gamma_0$: absolute term for determining $\hat{m}_{Zyl}$, and N: current sampling step.

11. The method according to claim 10, which comprises fixing a number of segments for which the load signal for the future is to be estimated, as a function of speed.

* * * * *

UNITED STATES PATENT AND TRADEMARK OFFICE

CERTIFICATE OF CORRECTION

PATENT NO. : 5,889,205

DATED : March 30, 1999

INVENTOR(S) : Stefan Treinies et al.

It is certified that error appears in the above-indentified patent and that said Letters Patent is hereby corrected as shown below:

On the title page,

Item [22] should read as follows:

Filed: Oct. 10, 1997

Signed and Sealed this

Twenty-sixth Day of October, 1999

Attest:

Q. TODD DICKINSON

*Attesting Officer*

*Acting Commissioner of Patents and Trademarks*